United States Patent
Ilani et al.

(10) Patent No.: US 7,606,315 B2
(45) Date of Patent: Oct. 20, 2009

(54) LINE SENSOR SELECTION FOR QUANTIFYING ALIEN CROSSTALK IN A SHARED COMMUNICATIONS MEDIUM

(75) Inventors: Ishai Ilani, Modiin (IL); Ram Zamir, Tel Aviv (IL)

(73) Assignee: Actelis Networks (Israel) Ltd, Petach Tikva (IL)

( * ) Notice: Subject to any disclaimer, the term of this patent is extended or adjusted under 35 U.S.C. 154(b) by 136 days.

(21) Appl. No.: 10/591,695

(22) PCT Filed: Mar. 23, 2005

(86) PCT No.: PCT/IL2005/000329

§ 371 (c)(1),
(2), (4) Date: Nov. 26, 2007

(87) PCT Pub. No.: WO2005/089064

PCT Pub. Date: Sep. 29, 2005

(65) Prior Publication Data

US 2008/0214118 A1  Sep. 4, 2008

Related U.S. Application Data

(60) Provisional application No. 60/555,333, filed on Mar. 23, 2004.

(51) Int. Cl.
H04L 27/00 (2006.01)
(52) U.S. Cl. ........................ 375/259; 375/222; 370/201; 379/417
(58) Field of Classification Search ............... 375/259, 375/222; 370/201; 379/417
See application file for complete search history.

(56) References Cited

U.S. PATENT DOCUMENTS

| 7,042,934 | B2 * | 5/2006 | Zamir | 375/222 |
| 2003/0074625 | A1 * | 4/2003 | Adar et al. | 714/752 |
| 2003/0137925 | A1 | 7/2003 | Zamir | |

OTHER PUBLICATIONS

"Self basis selection in a finite set", Ilani, I.; Zamir, R.; Electrical and Electronics Engineers in Israel, 2004. Proceedings. 2004 23rd IEEE Convention of Sep. 6-7, 2004 pp. 102-105.*

* cited by examiner

*Primary Examiner*—Ted Wang
(74) *Attorney, Agent, or Firm*—Pearl Cohen Zedel Latzer LLP (57) ABSTRACT

In a communication medium including a first set A of n communication channels and a second set U of m communication channels, a method for selecting sensor channels in A for quantifying crosstalk from U, including operating A in a receive-only mode (FIG. 2 Step of Initialize Modem pool A. Work in receive-only mode.), choosing a subset $S_1$ of A, estimating the expansion coefficients of A as a predefined function of subset $S_1$ and signals received by A (FIG. 2 Step of Choose a set S1 of m modems in A and estimate the expansion coefficients $g_{ij}$ of modems in A relative to S1), choosing a candidate subset $S_2$ of size m of A where the determinant of a matrix of the expansion coefficients corresponding to the subset $S_2$ is greater than that of the expansion coefficients corresponding to any other subset of size m of A divided by a predefined bound D (FIG. 2 Step of Choose an initial candidate subset S2 where det $(A_{S2})$ det $(A_S)$/D), calculating a threshold alpha, choosing a final subset $S_2$ that is an -amplifier of (FIG. 2Step of Test S2 until a final subset S2 is found which is an -amplifier for a defined), and employing the communications channels in the final subset $S_2$ as sensor channels (FIG. 2 Step of Use the modems corresponding to the final subset S2 as the sensor set for the remaining modems m-n in A) for quantifying crosstalk from U.

3 Claims, 5 Drawing Sheets

LINE SENSOR SELECTION FOR QUANTIFYING ALIEN CROSSTALK IN A SHARED COMMUNICATIONS MEDIUM

CROSS-REFERENCE TO RELATED APPLICATIONS

This application is a U.S. National Phase Application under 35 U.S.C. 371 of PCT International Application No. PCT/IL2005/000329, which has an international filing date of Mar. 23, 2005, and which claims priority from U.S. Provisional Patent Application No. 60/555,333, filed Mar. 23, 2004, both of which are incorporated herein by reference in their entirety.

FIELD OF THE INVENTION

The present invention relates to telecommunications systems in general, and more particularly to methods and apparatus for crosstalk cancellation.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks (including traffic over the Internet) for the transmission of documents and electronic mail.

Digital Subscriber Loop (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the public switched telephone network PSTN) at multiple megabit speeds using sophisticated signal processing techniques that permit voice and data to travel simultaneously over the same analog copper twisted pair wire.

Where DSL modems are arranged in a modem pool such that two or more modem connections are carried via the same copper wire bundle, contending with crosstalk between co-interfering modems becomes an important issue. Moreover, other wire pairs in the bundle are likely to be used by other "alien" services that have nothing to do with the modem pool. In this case, the overall noise within the bundle is likely to be composed of both self-caused crosstalk among modems of the modem pool, as well as crosstalk caused by the alien services. Techniques have been developed to cancel crosstalk from alien services, where the alien crosstalk is first quantified by employing one or more transmission transmission lines within the modem pool as sensors, and then cancelled within the modem pool. However, different combinations of lines as sensors may result in better or worse alien crosstalk cancellation. While testing every possible combination of sensor lines would yield the optimal combination, doing so is impractical given typical operational time constraints. Therefore, techniques for deciding which combinations of lines to designate as sensors without requiring that each possible combination be tried would be advantageous.

SUMMARY OF THE INVENTION

In one aspect of the present invention a method is provided in a communication medium including a first set of n communication channels and a second set of m communication channels, the method for selecting sensor channels in the first set for quantifying crosstalk from the second set, the method including a) operating the first set of communication channels in a receive-only mode, b) choosing a subset $S_1$ of size m of the n communication channels, c) estimating the expansion coefficients of the n communication channels as a predefined function of the subset $S_1$ and signals received by the n communication channels, d) choosing a candidate subset $S_2$ of size m of the n communication channels where the determinant of a matrix of the expansion coefficients corresponding to the subset $S_2$ is greater than the determinant of a matrix of the expansion coefficients corresponding to any other subset of size m of the n communication channels divided by a predefined bound D, e) calculating a threshold $\alpha$, f) choosing a final subset $S_2$ that is an $\alpha$-amplifier of the threshold $\alpha$, and g) employing the communications channels in the final subset $S_2$ as sensor channels for quantifying crosstalk from the second set of communication channels.

In another aspect of the present invention the calculating a threshold step includes calculating $\alpha$ as a predefined function of the bound D and a predefined number I of replacement iterations.

In another aspect of the present invention the choosing a final subset step includes replacing any of the channels in the candidate subset $S_2$ during at most the I replacement iterations.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
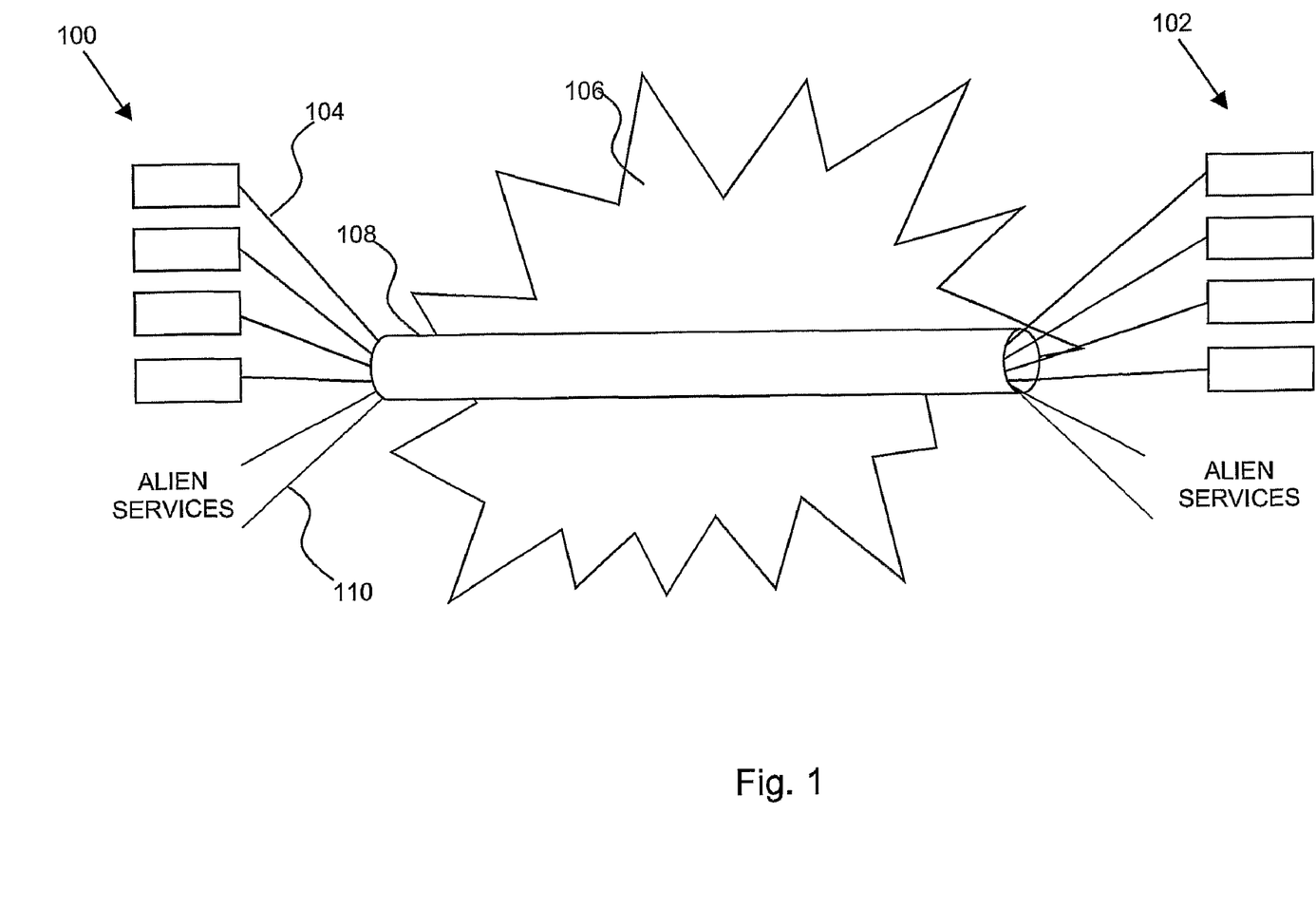
FIG. 1 is a conceptual illustration of an exemplary modem pool arrangement useful in understanding the present invention.

Reference is now made to FIG. 1, which is a conceptual illustration of an exemplary modem pool arrangement useful in understanding the present invention. A first modem pool, generally referenced 100, and comprising a plurality of individual modems is seen in communication with a second modem pool, generally referenced 102, via a plurality of connections 104 over a telephone network 106. Connections 104 are typically copper wire pairs arranged in a bundle 108.

The modem pools preferably operate in a coordinated manner where a data stream is split up and transmitted via multiple modems in one of the modem pools to the other modem pool where the original data stream is reconstructed. One or more alien services not part of modem pools 100 and 102 are also shown communicating via connections 110 that are also in bundle 108.

Figure 2:
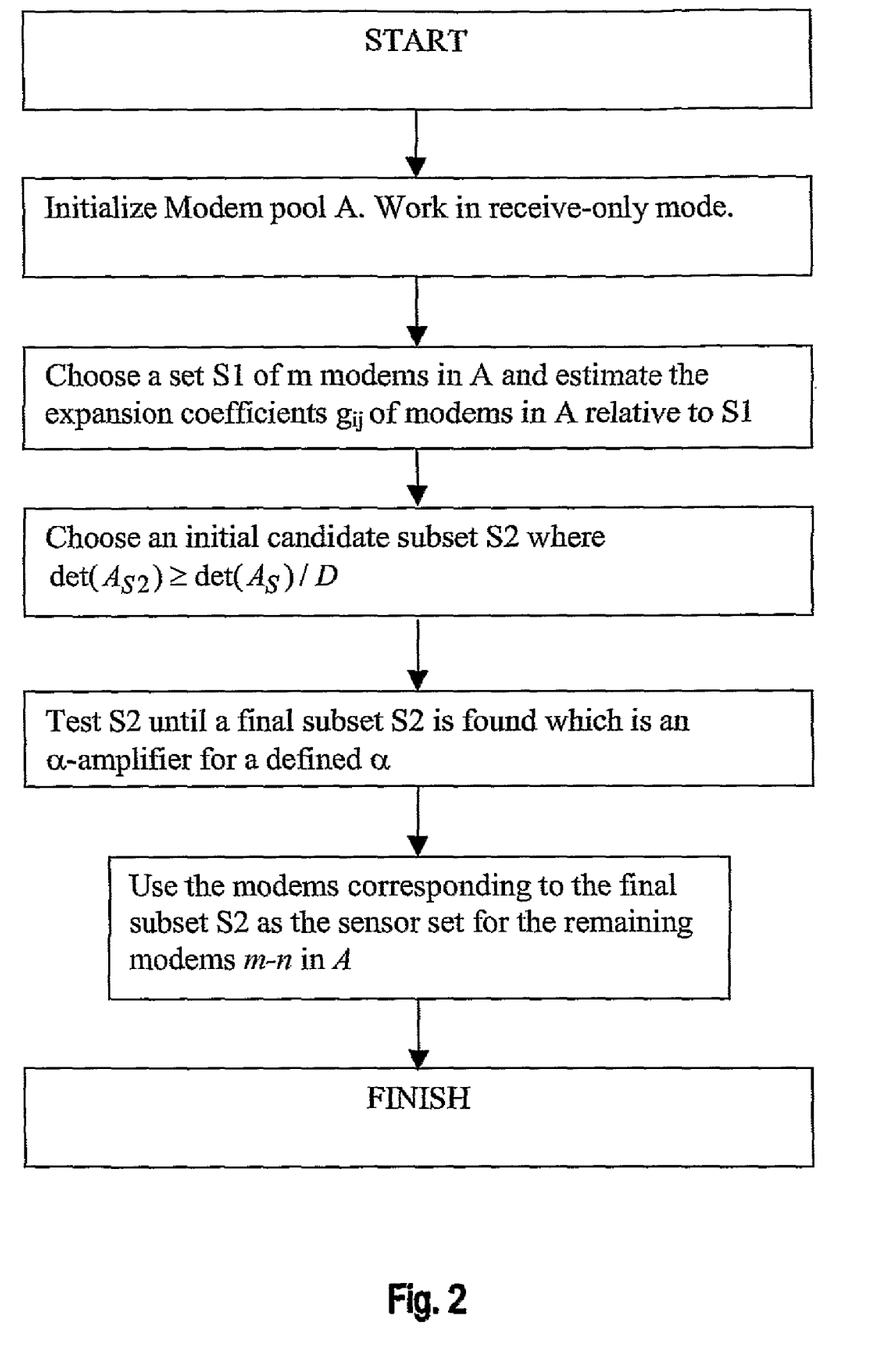
FIG. 2 is a simplified flowchart illustration of a method for selecting sensors in a shared communication medium for quantifying alien crosstalk, operative in accordance with a preferred embodiment of the present invention.

Reference is now made to FIG. 2 which is a simplified flowchart illustration of a method for selecting sensors in a shared communication medium for quantifying alien crosstalk, operative in accordance with a preferred embodiment of the present invention. Although the present invention is now described for illustration purposes only with regard to communication channels between modems in two modem pools that are carried by copper wire pairs in a wire bundle, such as is described in FIG. 1, it will be appreciated that the present invention is applicable with regard to any other communication medium, such as in a wireless communications environment which is shared by multiple communication channels that may be affected by crosstalk from one another.

By way of introduction, given a first set $A=\{a_1,a_2,\ldots,a_n\}$ of n modems working together as a modem pool to send and receive transmissions via a shared communications medium, such as a wire bundle, and given a second set U of m external modems also sending and receiving transmissions via the same shared communications medium and thereby interfering with the first set A, a subset S of $\{1,2,\ldots,n\}$ of size m may be found such that the set of modems $A_S=\{\alpha_k|k\in S\}$ can serve as a set of sensors for the remaining n-m modems. The signal measurements measured by the modems in $A_S$ may be used to estimate the interference caused by U to the remaining n-m modems in order to partly or wholly reduce the interference caused by U from signals received by the remaining n-m modems and thus increase the total data rate of the modems in A. While any combination of modems may be selected from A to form S, since the communication channel of a modem in A may be physically closer to or farther from a communication channel of a modem in U within the shared communications medium, and thus be able to detect a stronger or weaker crosstalk signal from the U modem, different combinations of modems selected from A to form S may result in better or worse detection of U crosstalk, and thus more or less successful cancellation of U crosstalk from the remaining n-m modems.

Selecting the best combination of modems in A from which to form S may be expressed mathematically as follows. In the following model of n linearly distorted noisy measurements $x_i$ of a vector $u=(u_1,u_2,\ldots,u_m)^T$, where each $u_j$ corresponds to an external disturber, $x_i=\langle a_i,u\rangle+z_i$, $i=1,\ldots,n$, where each $x_i$ is the noise measurement on line i which includes the correlation with external noises caused by U and other uncorrelated noise sources $z_i$, $a_i=(\alpha_{i1},\alpha_{i2},\ldots,\alpha_{im})^T$ is the corresponding vector of linear distortion coefficients, $z_i$ is the corresponding uncorrelated noise, and $\langle\ldots\rangle$ denotes inner product. A subset $s\subset\{1,\ldots,n\}$ of size $|S|=m$ may be found such that the measurements $\{x_k,k\in S\}$ are "good sensors" for the remaining measurements $\{x_i,i\notin S\}$. The minimum Mean Squared Error (MSE) estimate of $x_i$ from $\{x_k,k\in S\}$, which is given in general by the conditional expectation $\bar{x}_i=E\{x_i|x_k, k\in S\}$, takes the linear form:

$$\bar{x}_i=\langle g_i,x_S\rangle, \qquad (1)$$

where $g_i=(g_{i1},g_{i2},\ldots,g_{im})^T$ is a vector of linear estimation coefficients, and $x_S$ is a vector with coefficients $\{x_k,k\in S\}$. Furthermore, as $\sigma^2\to 0$, i.e. when the uncorrelated noise sources $z_i$ are weak compared to the interference noise sources $\langle a_i,u\rangle$, the optimal $g_i$ approaches the Least Squares (LS) solution, i.e., the expansion of $a_i$ in terms of the vectors $\{a_k,k\in S\}$:

$$a_i=\sum_{k\in S}g_{i,k}\cdot a_k=A_S\cdot g_i. \qquad (2)$$

Combining (1) and (2), it follows that the estimation error of the LS solution is $$\bar{x}_i-x_i=\langle g_i,z_S\rangle-z_i, \qquad (3)$$

where $z_S$ is the vector $\{k\in S\}$. Hence, the resulting MSE is $E[\bar{x}_i-x_i]^2=\sigma^2(\|g_i\|^2+1)$. The noise is amplified by the expansion coefficients of $a_i$ relative to the basis S, and a "good basis" will be a basis such that the expansion coefficients of $a_i$ relative to that basis are small numbers in absolute value terms.

A basis S is an α-amplifier if the expansion coefficients of all the vectors outside S are absolutely bounded by α, i.e., for $i\notin S$ $|g_{i,j}|\leq\alpha$ for all j. The expansion coefficients $g_{i,j}$ naturally form a matrix G of size m×n where each column i includes the expansion coefficients of vector i. In the modem pool arrangement of FIG. 1, the vectors represent modems or communication channels, and thus each column i of G includes the expansion coefficients of modem i or communication channel i. With each subset S of modems or communication channels a matrix $A_S$ may be constructed which is a sub-matrix of G whose column indices are the same as the indices of S. According to Cramer's rule, the basis associated with a matrix $A_S$ with a maximal determinant is a 1-amplifier, and therefore a 1-amplifier always exists. The present invention provides a low-complexity algorithm for finding a basis which is, or which is close to, a 1-amplifier. In terms of the modem pool arrangement described in FIG. 1, finding a good basis which is an α-amplifier for a small α is a matter of finding a set of modems that will act as a sensor set for the remaining n-m modems and that is at most an α-amplifier for a relatively small α.

Thus, in the method of FIG. 2, given a first set of n communication channels and a second set of m communication channels, where m<n, a set of sensor channels is selected from set n for quantifying and reducing crosstalk from m as follows. Prior to the selection of the sensors, the first set n of communication channels is preferably operated in a receive-only mode, where no signals are transmitted by any of the n modems. A subset $S_1$ preferably of size m is then selected from among the n communication channels. The expansion coefficients for all n communication channels are then preferably estimated as a predefined function of subset $S_1$ and the signals received by the n communication channels. This may be derived from the cross-correlation matrix for all the signals received on all n communication channels or by any other known method. This step may be unnecessary where the correlation coefficients $a_i$ are given.

A bound D is defined, and a candidate subset $S_2$ of sensor channels, preferably of size m, is then selected from among the n communication channels, where the determinant of the matrix $A_{S2}$ of the expansion coefficients corresponding to subset $S_2$ is greater than the determinant of a matrix of the expansion coefficients corresponding to any other subset of size m of the n communication channels divided by D. Thus, a subset $S_2$ is selected such that for every subset S of size m:

$$\det(A_{S2})\geq\det(A_S)/D$$

Figure 3:
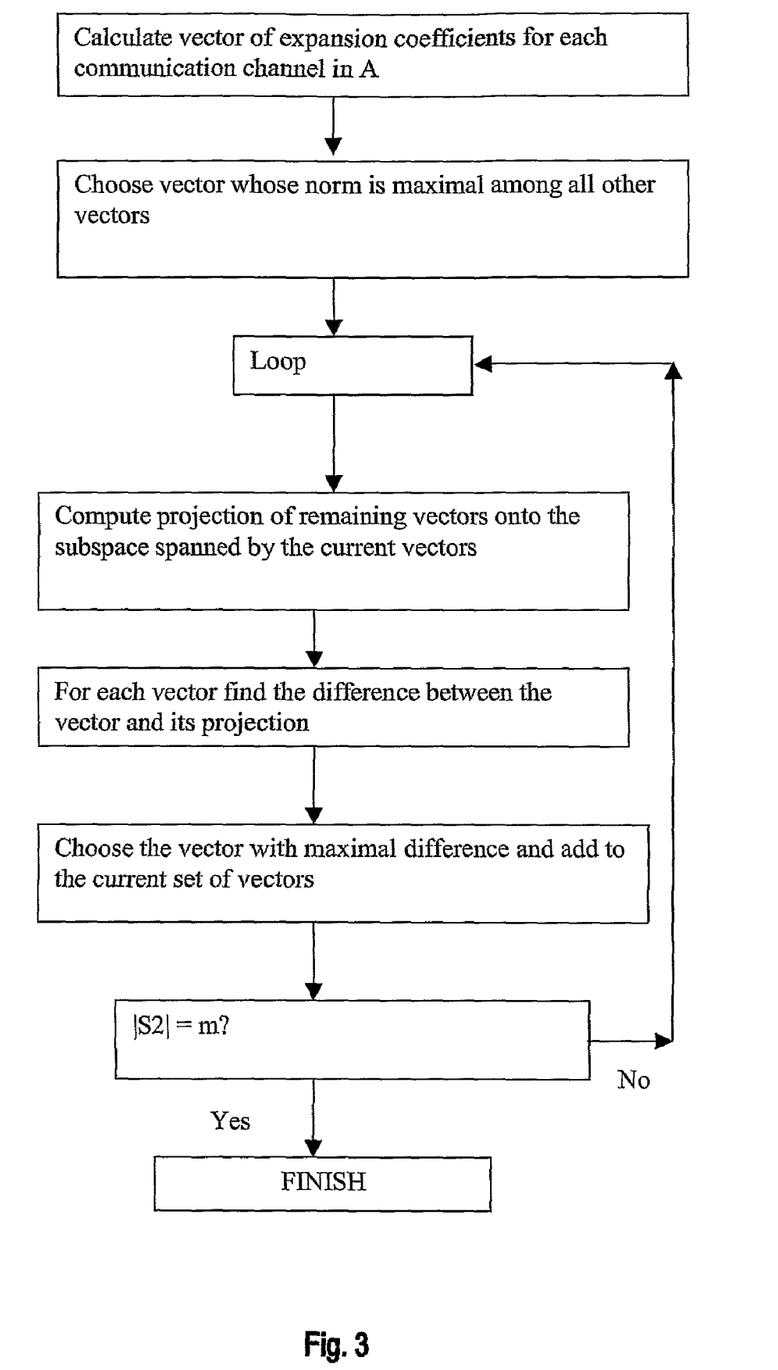
FIG. 3 is a simplified flowchart illustration of a method for selecting set a candidate set $S_2$ of sensor channels, operative in accordance with a preferred embodiment of the present invention.
Figure 4:
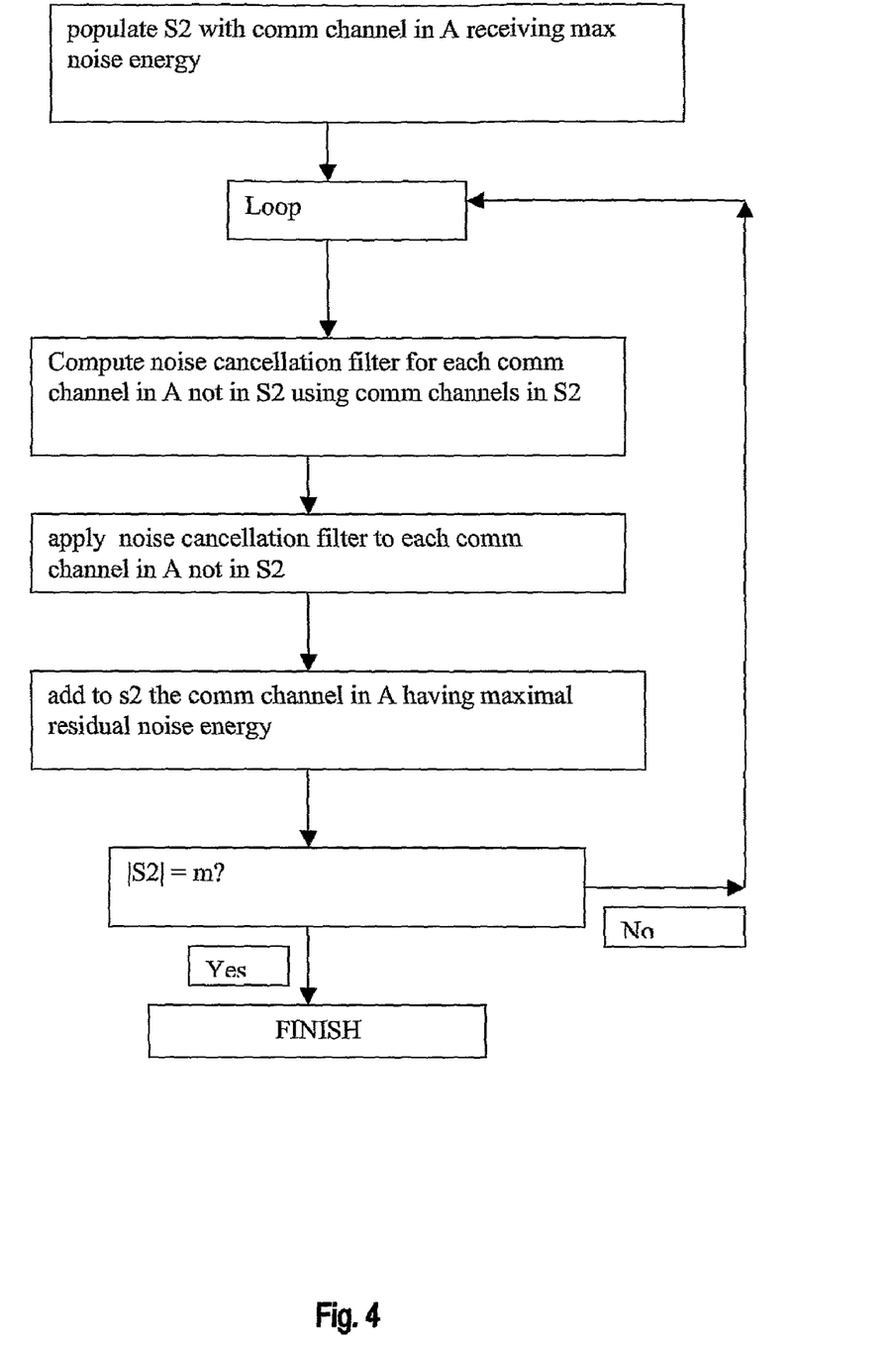
FIG. 4 is a simplified flowchart illustration of an alternate method for selecting a candidate set $S_2$, operative in accordance with a preferred embodiment of the present invention.

Setting D=1, will yield the subset $S_2$ with maximal determinant, however finding this subset requires the computation of all $$\binom{n}{m}$$

determinants associated with all the possible subsets S of size m, and this may be very complex The present invention D=$\sqrt{m^m}$ is preferably selected, and a preferred methods for selecting $S_2$ are described in greater hereinbelow with reference to FIGS. 3 and 4.

Figure 5:
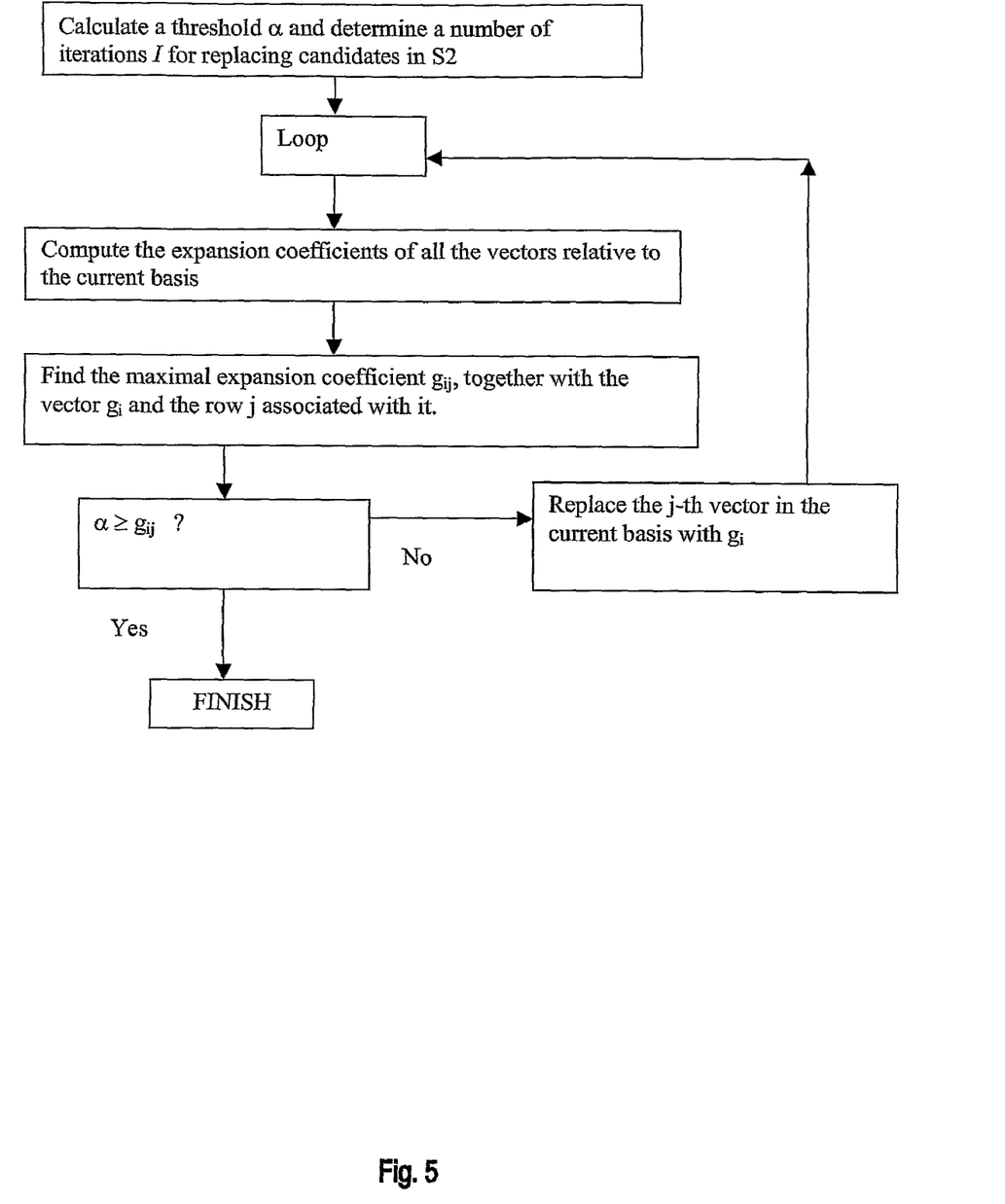
FIG. 5 is a simplified flowchart illustration of a method for selecting a final subset $S_2$, operative in accordance with a preferred embodiment of the present invention.

Once $S_2$ is chosen, the final subset of m sensor channels may be selected based on the initial choice of $S_2$ as follows. A threshold $\alpha$ is calculated as a function of bound D and a predefined number of replacement iterations I. Preferably, D=$\sqrt{m^m}$, and $\alpha=m^{m/2(I+1)}$. As is shown in FIG. 5, a final subset $S_2$ of size m of the n communication channels is then chosen that is an $\alpha$-amplifier by performing at most I iterations of the following steps:

1) Estimate the expansion coefficients of all n communication channels as a function of the candidate subset $S_2$ chosen during the previous iteration. For the first iteration, the previous subset is $S_2$.

2) Find the maximal absolute value of all the expansion coefficients corresponding to communication channels outside of the candidate subset $S_2$ and compare it to $\alpha$. If it is less than or equal to a then stop at the current iteration, and choose the previous candidate subset $S_2$ as the final subset of n to be used as the sensor lines. If the maximal absolute value of all the expansion coefficients is greater than $\alpha$, then replace one line in the candidate subset $S_2$ with the line for which the maximum expansion coefficient has been achieved. Each expansion coefficient is associated with one line in candidate subset $S_2$. The line to be replaced in candidate subset $S_2$ is the line in candidate subset $S_2$ that is associated with the maximal coefficient. Thus, if the expansion coefficients of communication channel i are $g_{ij}$, then channel j of candidate subset $S_2$ is replaced by channel i, where i,j is the pair that achieved the maximal expansion coefficient $g_{ij}$ in absolute value terms.

If the final subset $S_2$ has been properly chosen, the iterative process for choosing the final subset $S_2$ will typically stop after at most I iterations, and the final subset $S_2$ will be an $\alpha$-amplifier or better for $\alpha=m^{m/2(I+1)}$. Choosing I=$m^2$ (or higher) assures that $\alpha \leq 1.4$. Once the final subset $S_2$ is chosen, the sensors in the final subset $S_2$ may be used to quantify the crosstalk interference caused by U in accordance with conventional techniques, whereupon the crosstalk interference may be partly or wholly cancelled from the signals received by the remaining n-m modems/channels in A.

Reference is now made to FIG. 3, which is a simplified flowchart illustration of a method for selecting set a candidate set $S_2$ of sensor channels, operative in accordance with a preferred embodiment of the present invention. In the method of FIG. 3, after choosing subset $S_1$ and computing the expansion coefficients of each of the n communication channels relative to $S_1$, column vectors are created from the expansion coefficients, where each vector corresponds to the expansion coefficients of a specific communication channel in the set A. The communication channel whose vector of expansion coefficients has the largest norm of all vectors of expansion coefficients (i.e., the longest of all column vectors) is preferably chosen as the first communication channel in $S_2$. m-1 iterations are then preferably performed as follows:

1) Calculate the projection of all the vectors corresponding to communication channels not yet chosen on the span of the vectors corresponding to communication channels which were chosen (i.e., at iteration j, j vectors have been chosen, and thus the projection of each of the remaining n-j vectors onto the span of the chosen j vectors is calculated).

2) For each of the remaining vectors calculate the difference between the said projection and the vector.

3) Choose the communication channel corresponding to the vector whose difference is maximal and add it to the set of chosen communication channels.

Denoting the matrix associated with $S_2$ as $A_{S2}$, it may be seen that this technique ensures that $\det(A_{S2})$ satisfies: $|\det(A_{S2})| \geq M/\sqrt{m^m}$, where M is the maximal determinant associated with any subset of m communication channels of the first set of n communication channels A.

Reference is now made to FIG. 4, which is a simplified flowchart illustration of an alternate method for selecting set $S_2$, operative in accordance with a preferred embodiment of the present invention. In the method of FIG. 4, $S_2$ is calculated directly from the signals received on all n communication channels in A without first calculating any expansion coefficients. This may be done by choosing the first communication channel in $S_2$ to be the communication channel of A for which maximal noise energy from the external set of disturbers U is received. For each of the remaining n-1 channels in A, a noise cancellation filter, denoted NC, is then computed using conventional techniques, such as by using an LMS algorithm. For each of the remaining channels, NC is then operated to subtract the crosstalk interference from the external disturber set U, which is correlative to the crosstalk interference received by the channels in the set $S_2$ from the signals received by each of the said remaining channels. After subtracting the correlative crosstalk from each of the remaining channels, the channel in A whose residual noise energy is maximal to all the other remaining channels in A is preferably added to subset $S_2$. The process of computing noise cancellation filters to cancel the noise which is correlative to the noise on the subset $S_2$ is preferably repeated m-1 times, and at each repetition the channel in A whose residual noise energy is greatest is preferably chosen and added to $S_2$.

The present invention may be applied to many different communications systems, but particularly to systems based on Discrete Multi-Tone (DMT), or Orthogonal Frequency Division Multiplexing (OFDM), since the channel response of each frequency bin in such systems is modeled as a scalar multiplication, which is similar to a memory-less time domain systems. Furthermore, the sensor selection process may be performed separately for each frequency bin, and the subsets chosen for different frequency bins may be different from each other.

While the present invention has been described with reference to equal sampling rates for all modems, it is appreciated that the present invention may be adapted for use in systems where sampling rates vary.

It is appreciated that one or more of the steps of any of the methods described herein may be omitted or carried out in a different order than that shown, without departing from the true spirit and scope of the invention.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a communication medium including a first set of n communication channels and a second set of m communication channels, a method for selecting sensor channels in said first set for quantifying crosstalk from said second set, the method comprising:
   a) operating said first set of communication channels in a receive-only mode;
   b) choosing a subset $S_1$ of size m of said n communication channels;
   c) estimating the expansion coefficients of said n communication channels as a predefined function of said subset $S_1$ and signals received by said n communication channels;
   d) choosing a candidate subset $S_2$ of size m of said n communication channels where the determinant of a matrix of said expansion coefficients corresponding to said subset $S_2$ is greater than the determinant of a matrix of said expansion coefficients corresponding to any other subset of size m of said n communication channels divided by a predefined bound D;
   e) calculating a threshold $\alpha$;
   f) choosing a final subset $S_2$ that is an $\alpha$-amplifier of said threshold $\alpha$; and
   g) employing said communications channels in said final subset $S_2$ as sensor channels for quantifying crosstalk from said second set of communication channels.

2. A method according to claim 1 wherein said calculating a threshold step comprises calculating $\alpha$ as a predefined function of said bound D and a predefined number I of replacement iterations.

3. A method according to claim 2 wherein said choosing a final subset step comprises replacing any of said channels in said candidate subset $S_2$ during at most said I replacement iterations.

* * * * *

UNITED STATES PATENT AND TRADEMARK OFFICE
CERTIFICATE OF CORRECTION

PATENT NO. : 7,606,315 B2 Page 1 of 1
APPLICATION NO. : 10/591695
DATED : October 20, 2009
INVENTOR(S) : Ilani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 161 days.

Signed and Sealed this

Fifth Day of October, 2010

David J. Kappos
*Director of the United States Patent and Trademark Office*